3,361,458
DOUBLE WEDGE ECCENTRIC BALL JOINT
Edward J. Herbenar, Detroit, Mich., assignor to TRW Inc., Cleveland, Ohio, a corporation of Ohio
Filed Mar. 16, 1967, Ser. No. 623,675
2 Claims. (Cl. 287—90)

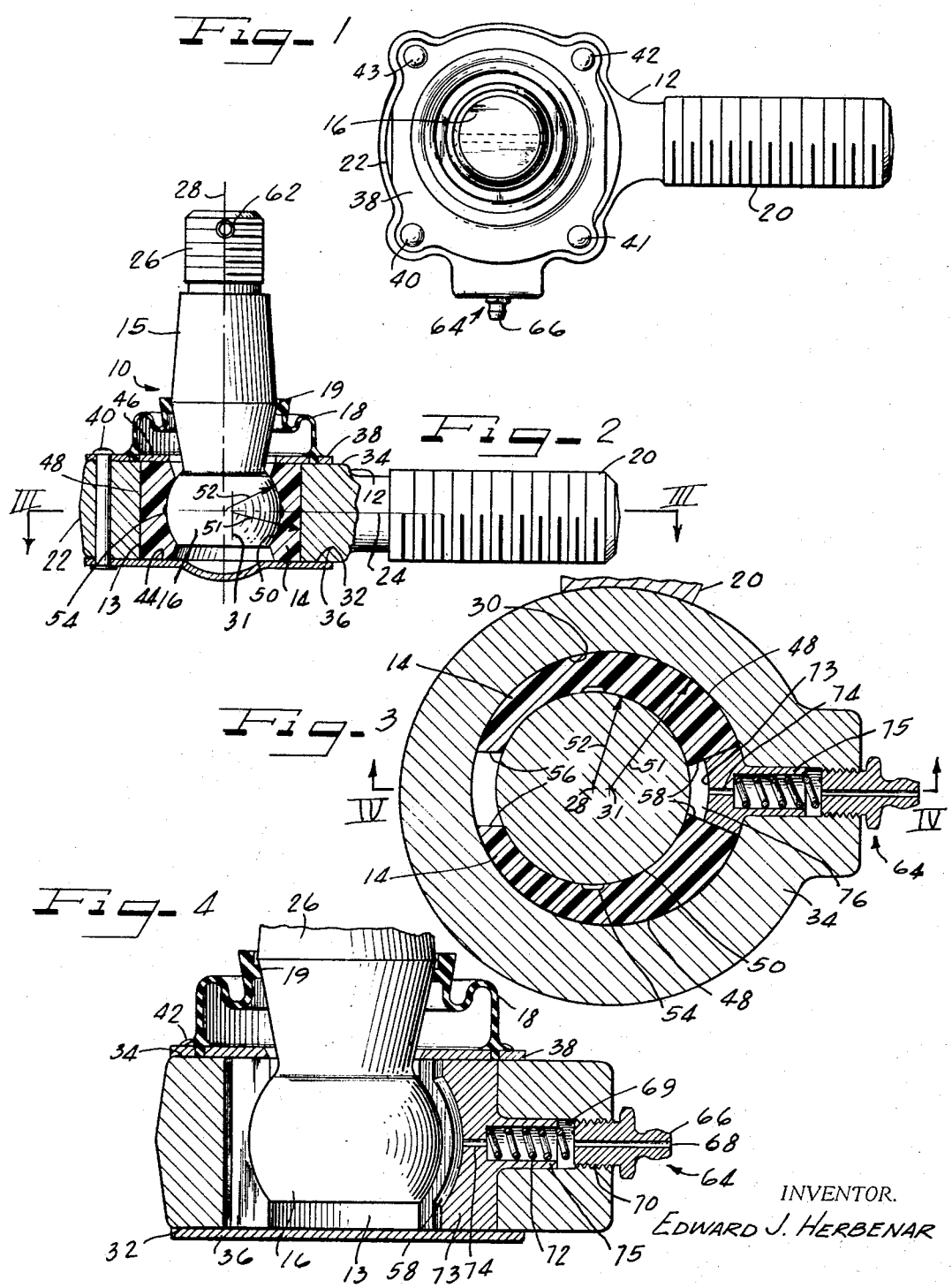

ABSTRACT OF THE DISCLOSURE

A socket assembly, particularly a ball and socket joint having eccentric bearing wedge seats shiftable in the socket by an interposed spring-loaded radial wedge to maintain the joint components in good bearing relation.

Field of the invention

This invention relates to eccentric joints for connecting links such as drag links, tie-rods, radius rods and the like wherein, eccentric bearing members are urged by a wedge and spring into proper seated relation in a housing.

Prior art

It is known for example, in the Gair U.S. Patent 3,030,134 to have a socket assembly with eccentric bearing rings embracing a stud and shiftable in the socket by an enveloping split wire ring expansion spring to maintain the joint components in close bearing relation. In such an arrangement, the wire spring is contracted and has offset ends engaging a pair of opposed eccentric bearings. The spring urges the bearing rings apart to thereby maintain the socket components in good bearing relation and take up any wear developed between the contacting surfaces. In such constructions the bearing rings can rotate completely around the interior of the socket to appreciably vary the centerline of the stud.

Summary

According to the present invention a forged or cast eye-type housing has an externally threaded stud projecting therefrom. The housing has a bore eccentrically displaced from the axis of the stud.

A pair of eccentric bearing wedge seats having outer semi-cylindrical surfaces slidably fit in the cylindrical bore and have fragmental spherical inner bearing surfaces that are eccentrically displaced relative to the outer cylindrical surfaces of the bore.

An interposed spring-loaded non-rotatable radial wedge between the eccentric bearing wedge seats spreads the large ends of the eccentric bearing wedge seats apart so as to maintain them in tight fitting relation with both the eye housing and the ball of the stud and without permitting the seats to rotate around the interior of the housing.

The invention thus provides an eccentric joint assembly of considerable strength having full rotation and wide tilting capacity of stud movement without appreciably varying the tilting and rotating center for the stud.

An object of the invention is to provide a socket assembly having eccentric bearing wedge seats for connecting links such as drag links, tie-rods, radius rods and the like, wherein an interposed spring-loaded radial wedge having a stem seated in a bore of the housing maintains the joint components in good bearing relation.

Another object of the invention is to provide a socket assembly having a standard type eye socket supporting a standard type ball stud wherein a pair of eccentric bearing wedge seats are urged circumferentially in a wear take-up direction by an interposed spring-loaded radial wedge.

Another object of the invention is to provide an eye-type housing with a laterally projecting stem having an axial center displaced from the axis of the eye and a ball stud mounted in the eye on a pair of eccentric bearing wedge seats which are rotated circumferentially within a cylinder formed in the eye-housing by an interposed spring-loaded radial wedge to take up wear developed during use of the joint.

A further object of the invention is to provide a tie-rod joint in which a pair of eccentric bearing wedge seats are shiftable in the socket by an interposed spring-loaded radial wedge to maintain the joint components in good bearing relation and prevent lash-type looseness.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 1 is a top plan view of the assembly of the invention;

FIG. 2 is a side elevational view with parts in vertical cross-section of an eccentric bearing joint and linkage assembly according to this invention;

FIG. 3 is a top sectional view of the joint of FIG. 2 taken along the line III—III; and FIG. 4 is a side elevational view of the ball joint of the invention of FIG. 3 taken along the line IV—IV.

As shown on the drawings:

The principles of this invention are particularly useful when embodied in a ball and socket joint such as illustrated in FIG. 1, generally indicated by the numeral 10. The joint assembly 10 includes a stemmed eye-type housing 12, having a bore 13 and a pair of eccentric bearing wedge seats 14, 14. A single shank ball stud 15 is tiltable and rotatable mounted in the bearing seats 14, 14. A grease seal 18 of plastic or rubber closes the top side of the housing 12.

The housing 12 has a generally cylindrical end 22 and a laterally projecting externally threaded stem 20 with a longitudinal axis 24. An externally threaded stud 26 extends from a ball head 16 of the single shank ball stud 15 and has a long axis 28.

A seal member 18 has a central aperture snugly receiving the stud shank 26 therethrough and thickened boss portions 19 surrounding these apertures to maintain the stud 15 in sealing engagement with the housing 12 without, however, interfering with the free tilting and rotating movements of the stud 15 in the housing.

The cylindrical bore 13 is centered on an eccentric axis 31 which extends from a bottom face 32 of the eye 12 to a top face 34. The housing 12 has bottom and top housing plates 36, 38, respectively, secured by means of rivets 40, 41, 42 and 43. A circular opening 39 in the top plate 38 allows passage of the stud 15.

The eccentric bearing wedge seats 14, 14 have flat bottom and top faces 44, 46, respectively. The semi-cylindrical outer walls 48 of the bearing seats 14, 14 sit in the cylindrical bore 13 of the housing 12 and are struck from a radius 51 centered on the eccentric axis 31. The bearing seats 14, 14 have fragmental spherical inner bearing surfaces 50 struck from a radius 52 on the transverse center line of the stem axis 28. Each inner surface 50 has a circumferential grease groove 54 around the major diameter thereof.

The bearing seats 14, 14 are each less than semi-cylindrical having narrow ends 56 and wide opposite ends 58 each in spaced relation when the bearing seats are disposed around the stud head 16.

The head 16 has a major diameter at the transverse center line 28 of the threaded shank 26. The stud 26 is threaded and has a transverse bore 62 therethrough to receive a cotter pin for a castellated nut. The center of the ball 16 is on the axes 24, 28 so that a non-eccentric tilting center is thereby maintained.

A threaded housing 64 in one face of the eye 12 includes a grease fitting 66 having a grease inlet 68. The housing 64 is in a lateral bore 69 in the face of the eye 12 and engages a threaded portion 70 at one end thereof. Within the lateral bore 69 is a spring 72 in contact with a spring-loaded spreader wedge 73. The spring loaded wedge 73 extends the length of the bore 13 and is in contact with the wide portions 58 of the eccentric bearing wedge seats 14, 14 along the entire length of said wide portions. The wedge 73 preferably derives support from the bottom and top plates 36, 38.

An inner grease inlet 74 extends from the bore 69 through a hollow spreader wedge stem 75 to an inner space 76 adjacent the stud 16. The stem 75 confines the wedge 73 to radial movement in the bore 13. Inner space 76 extends between the bottom and top plates 36, 38, respectively.

In operation, the eccentric bearing wedge seats 14, 14 compensate for wear as best shown in FIG. 3. The spring 72 acts on the stem 75 of the wedge 73 which is interposed between the eccentric bearing wedge seats 14, 14 which are urged in a circumferential direction towards the narrow ends of the bearing 56 to maintain a minimum working clearance on the ball stud head 16. This is a pivotal joint in which the bearing movement compensates for wear, never permitting lash-type looseness.

The housing member 12 can be forged to a cast metal. Bearings seats 14, 14 can be steel, powdered metal, plastic material or the like.

Summarizing, the eccentric bearing wedge seats are shiftable in the socket by the interposed spring-loaded radial wedge 73 to maintain the joint components in good bearing relation. The grease fitting 66 is an activating element for the spreader wedge 73 and constitutes a grease inlet 68 to the housing 12 which transmits grease to the bearings 14, 14. The pair of eccentric wedge bearing seats 14, 14 in the bore 13 have outer surfaces 48 rotatably seated on the bore wall 30 and inner surfaces 50 embracing and supporting the stud head 16. The interposed spring-loaded radial wedge 73 between the bearing seats 14, 14 is effective to shift the seats in the bore without permitting them to rotate around the bore to vary the centerline of the stud, the wedge thus also provides an abutment against rotation while spreading the seats into good bearing contact with the stud head 16 and the bore wall 30 to take up clearances therebetween.

Although various modern modifications might be suggested by those versed in the art, it should be understood that I wish to embody within the scope of the patent warranted hereon all such embodiments as reasonably and properly come within the scope of my contribution to the art.

I claim as my invention:

1. A double wedge eccentric ball joint comprising:
   (a) a housing having an axially extending main bore and a laterally extending grease inlet bore communicating with a side of the main bore;
   (b) a stud having a ball end in the main bore of the housing and a shank extending from the housing;
   (c) a pair of eccentric ball seats in the main bore having outer surfaces rotatably seated on the main bore wall and inner surfaces embracing and supporting the ball head;
   (d) means at the ends of the main bore supporting the ball seats against axial movement in the main bore;
   (e) a spreader wedge in the main bore between the eccentric ball seats extending the length of the main bore and deriving support from said means at the ends of the main bore;
   (f) said wedge having an integral stem slidably seated in said grease inlet bore;
   (g) a threaded plug secured to said housing in the grease inlet bore and having a standard grease fitting on one end;
   (h) a spring in the grease inlet bore engaging the other end of said threaded plug within said grease fitting bore and received by said stem to urge the wedge into the main bore and against the seats along the length of the seats for spreading the seats apart to rotate in the main bore and maintain good bearing engagement with the ball head; and
   (i) said wedge having a passageway accommodating flow of grease from said fitting to the space between the seats for lubricating the ball head.

2. The joint of claim 1 wherein said stem is hollow and receives one end of the spring therein.

References Cited

UNITED STATES PATENTS

| 1,042,492 | 10/1912 | Smith | 308—66 |
| 1,323,605 | 12/1919 | Meyer et al. | 308—68 |
| 3,030,134 | 4/1962 | Gair | 287—88 |

FOREIGN PATENTS

| 727,597 | 4/1955 | Great Britain. |

CARL W. TOMLIN, *Primary Examiner.*

A. V. KUNDRAT, *Assistant Examiner.*